United States Patent [19]

Clouse et al.

[11] 4,102,804

[45] Jul. 25, 1978

[54] INHIBITOR FOR GAS CONDITIONING SOLUTIONS

[75] Inventors: Robert C. Clouse; Robert G. Asperger, both of Midland, Mich.

[73] Assignee: The Dow Chemical Company, Midland, Mich.

[21] Appl. No.: 782,156

[22] Filed: Mar. 28, 1977

[51] Int. Cl.² ............................................... C09K 3/00
[52] U.S. Cl. ................................... 252/189; 252/391; 252/392; 252/389 R; 423/228; 423/229
[58] Field of Search ................. 252/391, 392, 389 R, 252/189; 21/2.7 R; 423/228, 229

[56] References Cited

U.S. PATENT DOCUMENTS

| | | | |
|---|---|---|---|
| 3,896,044 | 7/1975 | Mago et al. | 252/392 |
| 3,932,296 | 1/1976 | Byth | 252/392 |
| 3,992,313 | 11/1976 | Anderson et al. | 252/392 |

*Primary Examiner*—Benjamin R. Padgett
*Assistant Examiner*—J. L. Barr
*Attorney, Agent, or Firm*—Glwynn R. Baker

[57] ABSTRACT

The corrosion of iron and steel by an aqueous sour gas conditioning solution used to remove $CO_2$ from a gas stream is effectively inhibited by a combination of a quaternary pyridinium salt and an organic thioamide, a water-soluble sulfide or a water-soluble thiocyanate.

13 Claims, No Drawings

INHIBITOR FOR GAS CONDITIONING SOLUTIONS

BACKGROUND OF THE INVENTION

The present invention relates to a new inhibitor composition useful for preventing corrosion by solvents used in treating sour gas streams and to the inhibited solvent.

The conditioning of naturally occurring and synthetic gases by absorbing acidic gases such as $CO_2$, $H_2S$, COS, and HCN in an absorbent solution has been practiced commercially for many years. Gases such as feed gas for an ammonia plant, natural gas, and flue gas are examples. Aqueous solutions of various compounds such as alkanolamines, sulfolane (tetrahydrothiophene-1,1-dioxide), potassium carbonate, and mixtures of two or more of these have been used for the purpose. The water may be replaced in part or in whole by a glycol. All of these systems are plagued by corrosion of metal equipment which can be caused by products of degradation of the absorbent, by acidic components, or by products of reaction of these acidic components with the absorbent. For example, although aqueous alkanolamine itself is not particularly corrosive toward iron and steel equipment, it becomes highly corrosive when there is dissolved $CO_2$ present, particularly when it is hot. To combat this problem, various metal compounds have been used alone or in combination with other compounds as corrosion inhibitors, for example, compounds of arsenic, antimony, and vanadium. While such metal compounds are effective corrosion inhibitors, they have the disadvantages of low solubility in most gas conditioning solutions and of relatively high toxicity. The latter property is particularly undesirable since it affects both the handling of the solvent and the disposal of waste material. They are also ineffective in the presence of $H_2S$.

SUMMARY OF THE INVENTION

An organic inhibitor system for inhibiting corrosion of ferrous metals by solutions used in sour gas conditioning has now been found which comprises the combination of a quaternary pyridinium salt and a thio compound which is a water-soluble sulfide, a water-soluble thiocyanate or an organic thioamide in a weight proportion of one part of pyridinium salt to about 0.001-10 parts of thio compound. Some of the inhibitor combinations are conveniently handled and added to the gas conditioning solution as a concentrate dissolved in aqueous glycol, aqueous alkanolamine, or alcohol.

DETAILED DESCRIPTION

Essentially any pyridinium salt which is stable in the gas conditioning solution is operable in the invention. Preferably, this salt has the formula:

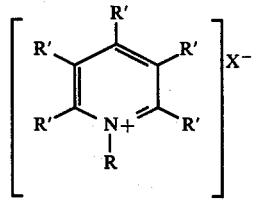

where R is an alkyl radical of 1-20 carbon atoms, a benzyl radical, or an alkylated benzyl radical wherein the aromatic ring has one or more alkyl substituents totaling 1-20 carbon atoms, each R' is a hydrogen atom or an alkyl radical of 1-6 carbon atoms, and X is any convenient anionic radical such as halide, sulfate, acetate, or nitrate. In the above general formula, X is preferably a bromine or chlorine atom and most preferably bromine. Best results are obtained when at least one R' represents an alkyl radical and particularly good inhibition has been found when the pyridine ring has multiple alkyl substituents. Preferably, R is a higher alkyl radical of about 10-18 carbon atoms.

The thio compound in the inhibitor combination is preferably a water-soluble thiocyanate such as an alkali metal thiocyanate or, most preferably, ammonium thiocyanate. It can also be an organic thioamide and essentially any such compound is operable. This class of compounds includes thiourea, a polythiourea, a hydrocarbon substituted derivative thereof, or a thioamide having the formula:

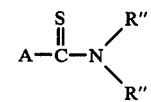

wherein A is a hydrocarbon radical of 1-12 carbon atoms or a pyridyl radical and each R" is a hydrogen atom or an alkyl radical of 1-8 carbon atoms. Thioamides such as thiourea, 1,2-diethylthiourea, propylthiourea, 1,1-diphenylthiourea, thiocarbanilide, 1,2-dibutylthiourea, dithiobiurea, thioacetamide, thionicotinamide, and thiobenzamide are representative of this class. Water-soluble sulfides such as ammonium sulfide, an alkali metal sulfide, or corresponding hydrosulfide including $H_2S$ are other operable thio compounds.

While any significant quantity of the inhibitor combination will provide some degree of inhibition of corrosion, at least about 50 parts per million concentration of the combination in the gas conditioning solution is usually required to provide practical protection. More than about 2,000 ppm of the inhibitor combination usually provides little or no added protection. Either the thio compound or the pyridinium salt alone will provide no inhibition or only partial inhibition. It appears that very little of the thio compound is usually needed in the presence of the pyridinium salt, however, concentrations as low as one part per million of thio compound in the presence of 50-100 parts per million of pyridinium salt having been found to give effective inhibition in some cases. About the maximum degree of inhibition obtainable with a particular combination is usually found when the concentration of the thio compound reaches a concentration of 10-100 parts per million. Higher concentrations of this component appear to offer little or no added benefit under most conditions but may help when the quaternary salt concentration is at a disproportionately higher level.

On the other hand, it has been found that at least about 50 parts per million and preferably 100-1000 parts of the pyridinium salt is required to obtain optimum results. For each combination, a maximum degree of inhibition seems to occur at a particular level within the preferred ranges described above and higher concentrations of either component or of the combined components provide slight added protection, if any. In many cases, higher concentrations seem to cause a slight decline in the degree of inhibition after a maximum has been reached.

The present invention affords effective inhibition of iron and steel corrosion by sour gas conditioning solutions containing dissolved $CO_2$ using relatively low concentrations of an inhibitor combination which is easily handled and convenient to use. A concentrate of the combined compounds when the thio compound is a thioamide or a sulfide can be made up in aqueous alkanolamine, aqueous glycol, or lower alkanol and this concentrate can be added to the gas treating solvent as required to make up or to maintain a desired concentration. Since thiocyanates tend to react on standing with the quaternary salt to form a difficultly soluble, less active product, these thio compounds are best added separately to the gas-treating solution, thereby forming the combination in situ at higher dilution.

This inhibitor combination is particularly useful in aqueous lower alkanolamine solutions known as sour gas scrubbing solvents. Preferred lower alkanolamines can be defined as those having the formula:

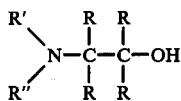

wherein R' and R" independently represent hydrogen or $-CR_2CR_2-OH$ and wherein each R may be hydrogen by an alkyl radical of 1-2 carbon atoms. Representative alkanolamines are ethanolamine, diethanolamine, triethanolamine, isopropanolamine, diisopropanolamine, and N-methyldiethanolamine. Related alkanolamines which are useful acidic gas absorbents are Methicol (3-dimethylamino-1,2-propanediol) and diglycolamine (2-(2-aminoethoxy)ethanol). Other gas-treating absorbents in which this inhibitor combination is effective include sulfolane (tetrahydrothiophene-1,1-dioxide) and aqueous potassium carbonate. These absorbents can be employed alone or in combinations of two or more, usually in aqueous solution although the water may be replaced in part or wholly by a glycol.

The inhibitor combination of this invention is also effective to inhibit corrosion of iron and steel by a gas-treating solution containing both $CO_2$ and $H_2S$ when the $H_2S$ is present in the solution at limited concentration, up to about 500 ppm, for example, and preferably not more than about 150 ppm. The inhibitor combination is thus of wider applicability than many known inhibitors which are not effective in the presence of dissolved $H_2S$.

Testing Procedure

The corrosion of mild steel by aqueous alkanolamine solutions saturated with $CO_2$ for 7 hours at 10°-20° C was measured at elevated temperatures and moderate pressure. Loosely capped bottles each containing 120 ml of test solution and a totally immersed 1 × 2.5 × 0.0625 inch coupon of 1020 mild steel were put in a modified pressure filter for a period of 16-18 hours, at 125° C and 40 psig unless otherwise specified. The test solvent was 30% aqueous ethanolamine unless otherwise specified. The steel coupons were previously cleaned with 5N HCl by immersion for 30 minutes at room temperature, followed by a soap and water wash, a water rinse, then an acetone rinse and air drying. At least two bottles of each trial solution were tested in each experiment along with three bottles of solution containing no inhibitor which served as controls. After testing, the same cleaning procedure was used except that the HCl treatment was 15 minutes with 5N HCl inhibited with Dowell A-120, a commercial HCl inhibitor (Dowell Division of The Dow Chemical Company), in order to remove any corrosion deposits. The corrosion rate and efficiency of inhibition were calculated according to the following formulas using the average weight loss of the test coupons:

$$\text{Rate (mils/yr)} = \frac{534 \times \text{mgs weight loss of coupon}}{(\text{coupon density, g/cc})(\text{coupon surface, sq in})(\text{hrs})}$$

$$\% \text{ Inhibition} = \frac{\text{Corrosion rate of blanks} - \text{rate of test coupons}}{\text{corrosion rate of blanks}} \times 100$$

Preparation of Quaternary Salts

The quaternary pyridinium salts used in the inhibitor compositions were made by heating a mixture of the pyridine compound with excess alkyl halide or benzyl halide at 90° C for 2 hours. The reaction mixture was then cooled and the quaternary salt was recovered as a solid or viscous liquid precipitate.

The inhibitor compositions were added to the aqueous ethanolamine as a solution in a small amount of 60% aqueous ethylene glycol or isopropyl alcohol.

EXAMPLE 1

The pyridinium quaternary salt used in these tests was the reaction product of tetradecyl bromide and high boiling alkylpyridine still bottoms (HAP), sold by Reilly Tar and Chemical Corp. These still bottoms were from processes for making various lower alkyl substituted pyridines wherein most of th components were pyridines having multiple lower alkyl substituents, particularly methyl and ethyl groups. This mixed quaternary salt was tested in combination with $NH_4SCN$, thioacetamide, thiourea, thionicotinamide, and thioisonicotinamide at various concentrations as noted.

| Thio | Concentration, ppm | | |
|---|---|---|---|
| Compound | Quat. Salt | Thio Compound | % Inhibition |
| $NH_4SCN$ | 100 | 10 | 82.5 |
| | 100 | 25 | 86.8 |
| | 500 | 25 | 91.6 |
| | 500 | 50 | 93.9 |
| Thioacetamide | 100 | 25 | 88.3 |
| | 100 | 50 | 83.2 |
| | 500 | 50 | 89.5 |
| Thiourea | 100 | 50 | 72.5 |
| | 500 | 50 | 77.6 |
| Thionicotinamide | 100 | 25 | 92.2 |
| | 100 | 50 | 92.2 |
| Thioisonicotin- | 100 | 25 | 92.2 |
| amide | 100 | 50 | 92.2 |

EXAMPLE 2

Combinations of thiourea with benzyl pyridinium chloride and with dodecylbenzyl alkylpyridinium chloride (made from the alkylpyridine still bottoms described in Example 1) were tested for inhibition as described above. A combination of dodecylbenzyl alkylpyridinium chloride with thioacetamide was also tested.

| Pyridinium Chloride | Concentration, ppm Quat. Salt | Thiourea | % Inhibition |
|---|---|---|---|
| Benzyl | 1000 | none | 11.1 |
|  | 1000 | 25 | 30.2 |
| Dodecylbenzyl | 1000 | none | 66.6 |
|  | 1000 | 1 | 89.7 |
|  | 1000 | 5 | 90.3 |
| Dodecylbenzyl | 1000 | 1* | 91.5 |
|  | 1000 | 5* | 90.6 |
|  | 1000 | 25* | 90.6 |

*Thio compound was thioacetamide

EXAMPLE 3

Quaternary salts made from various higher alkyl bromides and alkylpyridine still bottoms were tested as inhibitors with and without $NH_4SCN$ as in the foregoing examples.

| Pyridinium Bromide | Concentration, ppm Quat. Salt | $NH_4SCN$ | % Inhibition |
|---|---|---|---|
| Dodecyl | 100 | none | 7.2 |
|  | 100 | 50 | 64.4 |
|  | 500 | 100 | 73.1 |
| Cetyl | 100 | none | −34.4 |
|  | 100 | 50 | 59.7 |
|  | 500 | 100 | 62.3 |
| Octadecyl | 100 | none | −14.3 |
|  | 100 | 50 | 43.8 |
|  | 500 | 100 | 53.9 |

EXAMPLE 4

Qaternary salts made by reacting tetradecyl bromide with different alkylpyridines were tested as inhibitors in combination with $NH_4SCN$ by the procedure previously described.

| Alkylpyridine | Concentration, ppm Quat. Salt | $NH_4SCN$ | % Inhibition |
|---|---|---|---|
| 2-methyl- | 100 | 50 | 27.0 |
| 3-methyl- | 1000 | none | 54.5 |
|  | 1000 | 50* | 88.8 |
| 2-ethyl- | 50 | 50 | 3.2 |
|  | 100 | 50 | 31.1 |
| 3-ethyl- | 100 | 50 | 83.7 |
|  | 500 | 50 | 93.6 |
| 2,4-dimethyl- | 100 | 50 | 83.9 |
|  | 500 | 50 | 83.7 |
| 3,5-dimethyl- | 100 | 50 | 60.8 |
|  | 500 | 50 | 73.3 |
| 5-ethyl-2-methyl- | 100 | 50 | 82.5 |
|  | 500 | 50 | 90.9 |
| 3-ethyl-4-methyl- | 100 | 50 | 88.1 |
|  | 100 | 100 | 89.9 |
|  | 500 | 100 | 95.7 |
| 2,4,6-trimethyl- | 100 | 50 | 73.5 |
|  | 500 | 50 | 84.9 |

*Thio compound was thioacetamide

EXAMPLE 5

The quaternary salt of Example 1 (tetradecyl) alkylpyridinium bromide) was tested in combination with $NH_4SCN$ as before except for using 35% aqueous ethanolamine. Blanks were also run for comparison.

| Concentration, ppm Quat. Salt | $NH_4SCN$ | % Inhibition |
|---|---|---|
| 100 | none | −24.2 |
| 1000 | none | −36.9 |
| none | 100 | − 8.4 |
| none | 500 | −20.2 |
| 50 | 25 | 39.3 |
| 50 | 500 | 26.4 |

| Concentration, ppm Quat. Salt | $NH_4SCN$ | % Inhibition |
|---|---|---|
| 100 | 25 | 88.5 |
| 100 | 50 | 94.5 |
| 100 | 500 | 92.3 |
| 500 | 10 | 87.4 |
| 500 | 50 | 92.6 |
| 500 | 100 | 96.4 |
| 500 | 500 | 92.0 |
| 1000 | 25 | 81.0 |
| 1000 | 50 | 87.6 |
| 1000 | 100 | 89.2 |
| 1000 | 500 | 89.5 |

EXAMPLE 6

The same quaternary salt described in Examples 1 and 5 was tested as before in combination with $NH_4SCN$ at various concentrations using 15% aqueous ethanolamine as the test solvent.

| Concentration, ppm Quat. Salt | $NH_4SCN$ | % Inhibition |
|---|---|---|
| 10 | 10 | 44.4 |
| 10 | 500 | 48.5 |
| 50 | 10 | 68.3 |
| 50 | 50 | 91.9 |
| 50 | 500 | 95.9 |
| 100 | 10 | 96.4 |
| 100 | 50 | 95.8 |
| 100 | 500 | 96.2 |
| 500 | 10 | 93.2 |
| 500 | 50 | 93.3 |
| 500 | 500 | 94.8 |
| 1000 | 10 | 89.0 |
| 1000 | 50 | 87.6 |
| 1000 | 500 | 91.7 |

EXAMPLES 7–10

The quaternary salt described in Examples 1 and 5–6 was tested in combination with $NH_4SCN$ as before using various aqueous alkanolamine-containing solutions as test solvent.

| Concentration, ppm Quat. Salt | $NH_4SCN$ | Solvent | Corrosion mils/yr. | % Inhibition |
|---|---|---|---|---|
| — | — | 70% TEA[1] | 10.1 | — |
| 100 | 50 | " | 0.8 | 92.6 |
| 500 | 100 | " | 0.7 | 93.1 |
| — | — | 50% DEA[2] | 10.4 | — |
| 100 | 50 | " | 0.6 | 93.7 |
| 500 | 100 | " | 1.0 | 90.4 |
| — | — | 60% DEA[2] | 27.1 | — |
| 100 | 50 | " | 0.6 | 97.6 |
| 500 | 100 | " | 1.1 | 96.1 |
| — | — | Mixed[3] | 19.0 | — |
| 100 | — | " | 2.6 | 86.5 |
| 500 | — | " | 2.0 | 89.4 |
| 100 | 50 | " | 1.6 | 91.8 |
| 500 | 100 | " | 1.5 | 92.1 |

[1]TEA = Triethanolamine
[2]DEA = Diethanolamine
[3]Mixed = 45% diisopropanolamine, 35% sulfolane, 20% water

EXAMPLE 11

Combinations of tetradecyl alkylpyridinium bromide and $NH_4SCN$ were tested in 30% aqueous ethanolamine saturated with $CO_2$ and containing 100 ppm of sulfide ion added as ammonium sulfide under test conditions otherwise as previously described.

| Concentration, ppm | | % Inhibition |
| --- | --- | --- |
| Quat. Salt | NH₄SCN | |
| 100 | — | 76.5 |
| 500 | — | 94.1 |
| 100 | 50 | 76.6 |
| 500 | 50 | 89.2 |
| 100 | 100 | 77.1 |
| 500 | 100 | 93.3 |

In the above tests, the ammonium sulfide present in the alkanolamine solution to simulate the presence of H₂S served as the thio compound and so the quaternary salt was active even in the absence of NH₄SCN.

We claim:

1. A sour gas conditioning solution inhibited against CO₂ promoted corrosion of iron and steel by having dissolved therein an inhibiting concentration of a combination of one part by weight of a quaternary pyridinium salt and about 0.001–10 parts of a thio compound which is a water-soluble thiocyanate, a water-soluble sulfide, or an organic thioamide.

2. The inhibited solution of claim 1 wherein the pyridinium salt has the formula:

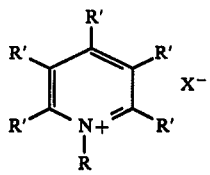

wherein R is an alkyl radical of 1–20 carbon atoms, a benzyl radical, or an alkylated benzyl radical wherein the aromatic ring has one or more alkyl substituents totaling 1–20 carbon atoms, each R' is a hydrogen atom or an alkyl radical of 1–6 carbon atoms, and X is an anionic radical and the organic thioamide is thiourea, a polythiourea, a hydrocarbon substituted derivative thereof, or a thioamide having the formula:

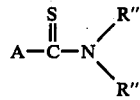

wherein A is a hydrocarbon radical of 1–12 carbon atoms or a pyridyl radical and each R″ is a hydrogen atom or an alkyl radical of 1–8 carbon atoms.

3. The inhibited solution of claim 2 wherein the thio compound is thiourea.

4. The inhibited solution of claim 2 wherein the thio compound is NH₄SCN.

5. The inhibited solution of claim 2 wherein R in the pyridinium salt formula is an alkyl radical of 10–18 carbon atoms.

6. The inhibited solution of claim 5 wherein the pyridinium salt is tetradecyl polyalkylpyridinium bromide.

7. The inhibited solution of claim 1 wherein the sour gas conditioning solution is a solution of a lower alkanolamine, sulfolane, potassium carbonate, or a mixture thereof in water, glycol, or a waterglycol mixture.

8. The composition of claim 7 wherein the solution is an aqueous lower alkanolamine.

9. The composition of claim 8 wherein the alkanolamine is ethanolamine.

10. The composition of claim 8 wherein the alkanolamine is diethanolamine.

11. The composition of claim 8 wherein the solution is a mixture of aqueous diisopropanolamine and sulfolane.

12. The inhibited solution of claim 1 wherein the concentration of the inhibitor combination is at least about 50 parts per million by weight.

13. An inhibitor composition consisting essentially of thiourea and the pyridinium salt of claim 1.

* * * * *